United States Patent
Turich et al.

(10) Patent No.: US 7,294,046 B2
(45) Date of Patent: Nov. 13, 2007

(54) METHOD FOR DRESSING A GRINDING WORM

(75) Inventors: Antoine Turich, Munich (DE); Gerhard Reichert, Maisach (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/081,274

(22) Filed: Mar. 16, 2005

(65) Prior Publication Data

US 2005/0221732 A1 Oct. 6, 2005

(30) Foreign Application Priority Data

Apr. 6, 2004 (EP) .................. 04008300

(51) Int. Cl.
| | |
|---|---|
| B24B 1/00 | (2006.01) |
| B24B 7/19 | (2006.01) |
| B24B 49/00 | (2006.01) |
| B24B 51/00 | (2006.01) |
| B24B 3/00 | (2006.01) |
| B24B 5/00 | (2006.01) |
| B23C 5/06 | (2006.01) |

(52) U.S. Cl. ............... 451/56; 451/11; 451/47; 451/219; 409/63

(58) Field of Classification Search ............ 451/47, 451/219, 56, 11, 21, 5; 409/63, 34
See application file for complete search history.

(56) References Cited

U.S. PATENT DOCUMENTS

| | | | | |
|---|---|---|---|---|
| 3,897,661 | A | * | 8/1975 | Inatomi et al. ............... 451/47 |
| 4,467,568 | A | * | 8/1984 | Bloch et al. ................. 451/24 |
| 4,972,564 | A | * | 11/1990 | Kawasaki et al. ............ 29/90.6 |
| 5,129,185 | A | * | 7/1992 | Erhardt et al. ............... 451/11 |
| 5,651,721 | A | * | 7/1997 | Schriefer .................... 451/11 |
| 5,890,950 | A | * | 4/1999 | Faulstich .................... 451/47 |
| 6,491,568 | B1 | * | 12/2002 | Jankowski ................... 451/5 |
| 6,497,610 | B1 | * | 12/2002 | Reichert ..................... 451/5 |
| 2004/0005843 | A1 | * | 1/2004 | Breitschaft et al. ........... 451/47 |
| 2004/0235401 | A1 | | 11/2004 | Schauer | |

FOREIGN PATENT DOCUMENTS

| | | |
|---|---|---|
| DE | 2857823 C1 | 2/1984 |
| DE | 10220513 A1 | 11/2003 |
| GB | 2018178 A * | 10/1979 |

OTHER PUBLICATIONS

"Instruction Manual For the TAG400 Windows Based PC Software Package", The Gleason Works, Rochester, New York, Mar. 8, 2002, pp. 32-33.

* cited by examiner

Primary Examiner—Joseph J. Hail, III
Assistant Examiner—Bryan Muller
(74) Attorney, Agent, or Firm—Robert L. McDowell

(57) ABSTRACT

A method for dressing an essentially cylindrical grinding worm on a machine suitable for continuous generation grinding in the diagonal method. The dressing tool is an essentially cylindrical gear wheel, having an abrasive coating on the surface that effects the dressing, which is brought into engagement with the grinding worm to move relative to the grinding worm in axial direction of the same to profile the flanks of the grinding worm. A periodically alternating movement in axial direction of the dressing gear wheel is superimposed on the relative movement of the dressing gear wheel, with the wavelength of the oscillating relative movement being the same or smaller than the usable width of the grinding worm in its axial direction.

5 Claims, 3 Drawing Sheets

METHOD FOR DRESSING A GRINDING WORM

This application claims the benefit of priority based on European Patent Application No. 04008300.8 filed Apr. 6, 2004.

FILED OF THE INVENTION

The invention relates to a method for dressing an essentially cylindrical grinding worm on a machine suitable for continuous generation grinding in the diagonal process, wherein a dressing tool, that is an essentially cylindrical gear wheel and has an abrasive coating on the surface which is active in the dressing, is brought into engagement with the grinding worm and moved relative to the grinding worm in the axial direction of the same to profile the flanks of the grinding worm.

BACKGROUND OF THE INVENTION

Cylindrical grinding worms are used for the continuous generation grinding of gear wheels. Because the grinding worm is subjected to natural wear and tear during this process, it has to be dressed from time to time, i.e., the material is removed from the flanks of the thread or the threads of the grinding worm with the dressing tool and the external diameter of the worm is also redressed corresponding to the amount of the radial advance in the dressing of the flanks.

A method of the type described above is known from DE 102 20 513 A1 (corresponding to US 2004/005843). With the known method, a grinding worm can be dressed in the tangential as well as in the diagonal process. In both cases, the gear wheel dressing tool performs a rectilinear move relative to the grinding worm. The relative movement occurs on a plane that is defined by the rotational axis of the dressing tool and by a parallel to the rotational axis of the grinding worm. FIG. 3 of the attached drawings describes the parallel to the rotational axis of the grinding worm as Y-axis, and the rotational axis of the gear wheel dressing tool, which is arranged relative to the Y-axis under the so-called crossed-axes angle, is described as the Z-axis.

During the machining in the tangential process, the relative movement 19 of the dressing tool is performed tangentially to the grinding worm, i.e., parallel to the Y-axis. During machining in the diagonal process, the rectilinear relative movement 20 of the dressing tool has a component in the direction Z. Because only a small part of the width of the dressing tool is used during the machining in the tangential or diagonal process, the wear and tear across the width of the dressing tool, i.e. in axial direction, is irregular. If the dressing tool operating in the tangential process is worn in a specific area of its width, it can be shifted in its axial direction to use the parts of the tool width that were not used previously. Because the tooth profile is not always exactly uniform across the width of the dressing tool for production reasons, the shift of the dressing tool may result in variations in the profile quality of the grinding worms dressed with the various areas of the dressing tool width. However, the deviations in the profile are reproduced in the gear wheels that are then ground with the grinding worms.

During the machining in the diagonal process, different areas of the width of the dressing tool engage with the grinding worm. For the reasons mentioned above, it is therefore difficult to obtain a grinding worm with a uniform profile across the entire width. This problem apparently increases with the width of the grinding worm. To extend the service life of the grinding worm, it is known to develop the grinding worm in a length that is many times longer than the engagement width used during the grinding. This creates the opportunity to shift the grinding worm in axial direction to bring an area that is not worn into engagement with the gear wheel to be ground. However, because the profile of a grinding worm dressed in the diagonal process is usually not uniform across the width of the grinding worm, for the reasons explained above, the gear wheels ground with the varying axial areas of the grinding worm are also not uniform. In a repeated dressing of the grinding worm in the tangential or in the diagonal process, it can therefore not be guaranteed that quality of the profile of the end product, i.e. the gear wheels, is uniform, regardless of what width area of the grinding worm was used in their grinding or how often the grinding worm was dressed.

The object to be attained by the invention is to modify the generic method so that the profile of the dressed grinding worms remains uniform across the width, and that the profile of each dressed worm is uniform across the useable width of the worm.

SUMMARY OF THE INVENTION

The present invention comprises a periodically alternating cross-movement in axial direction of the dressing tool with a specific amplitude and a specific wave length which is superimposed on the relative movement of the gear wheel dressing tool in axial direction of the grinding worm.

The wavelength of the oscillating relative movement is preferably the same or smaller than the engagement width $L_p$ of the grinding worm used in the machining of a work piece and also the same as or smaller than the circumference of the dressing gear wheel. In this way, all parts of a specific width range of the dressing gear wheel are used in the dressing of a utilized engagement width of the grinding worm, and a uniform profile is obtained over the entire width of the grinding worm.

Preferably, the amplitude of the oscillating relative movement is slightly smaller than half of the width of the dressing gear wheel. In this way, the dressing gear wheel is used across its entire width, i.e. each area of its width engages with the grinding worm.

The invention is explained in greater detail in the following by means of the Drawings, described below, which represent the present invention by way of example only.

DETAILED DESCRIPTION OF THE PREFERRED EMBODIMENTS

Figure 1:
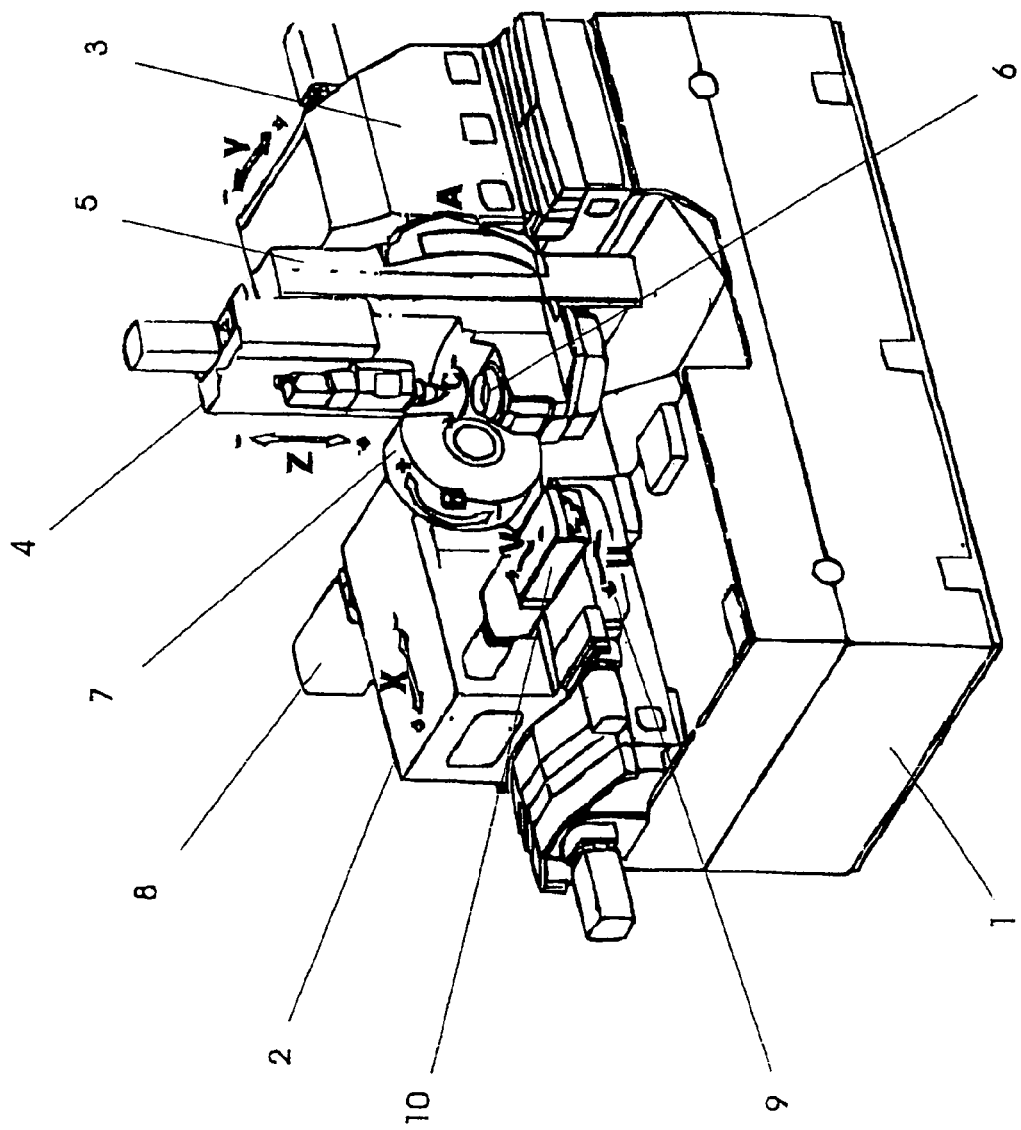
FIG. 1 is a perspective view of a gear wheel generation grinding machine according to the state of the art.

The gearwheel generation grinding machine shown in FIG. 1 is comprised of a bed 1, with a radial carriage 2 arranged on the bed to traverse in direction X and a tangential carriage 3 arranged on the bed to traverse in direction Y. A swinging base 5 is connected to the tangential carriage 3 to rotate in direction A. An axial carriage 4 is arranged on the swinging base 5 to traverse in direction Z. Thus, the axial carriage 4 can be traversed in both directions Y and Z and rotated in direction A. The axial carriage 4 accommodates the work piece spindle 6 and its drive. The work piece spindle 6 has clamping means (not shown) to accommodate a work piece.

The radial carriage 2 carries a tool drive 8 and a tool spindle (not shown), with a tool 7 developed as a cylindrical grinding worm being arranged torque-proof on the tool spindle. The radial carriage 2 furthermore carries the base for the accommodation of a conventional dressing apparatus. This type of dressing means is comprised, for example, of one or a plurality (not shown) of diamond-topped dressing wheels with support and drive. The axis of the dressing wheel (not shown) is advantageously located parallel to the axis of rotation of the grinding worm 7. The dressing means is traversable in direction U (parallel to direction X) with a U-carriage 9 and in direction V (parallel to direction Y) with a V-carriage 10.

The method in accordance with the invention uses an essentially cylindrical gear wheel instead of one or a plurality of dressing wheels, with the gear wheel having an abrasive coating on the surface that is effective in the dressing. The dressing gear wheel is arranged torque-proof on the work piece spindle 6. It can be clamped instead of the work piece, for example, or it can be integrated into the clamping apparatus of the work piece. However, it is also possible to accommodate the dressing gear wheel on the work piece spindle offset relative to the work piece. Principally, it is also possible to accommodate the dressing gear wheel at another location relative to the grinding worm, although this would require a greater structural effort.

The dressing gear wheel may practically have any helix angle or be straight-toothed. The dressing can be effected at the worm speed with which the grinding worm later machines the work pieces. It is not a problem to dress or profile even multi-threaded grinding worms very precisely at very high worm speed. All movements required for the dressing of the grinding worm can be performed by the machine axes already available. In this dressing process, the machine is used similar to a hobbing machine for worm-wheel cutting in the tangential process. To that end, it is only necessary to adjust the technological variables such as advance, feed and speed of rotation of the grinding worm 7 to the specific dressing problem on hand.

An essential characteristic of the dressing method in accordance with the invention is that the axial carriage 4 superimposes a periodically alternating movement on the movement of the work piece spindle 6 effected with the tangential carriage 3. The Y-direction is parallel to the axis of rotation of the grinding worm 7, and the Z direction is parallel to the axis of rotation of the work piece spindle 6. The angle formed by the two axes of rotation is described as the crossed-axis angle and usually deviates from 90°.

Figure 2:
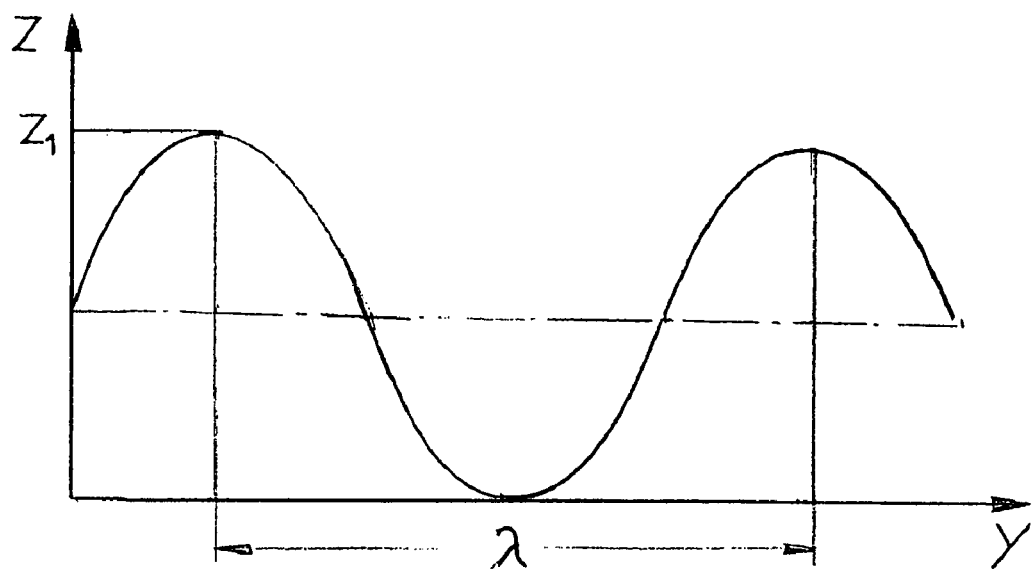
FIG. 2 is a schematic representation of the oscillating movement of a gear wheel dressing tool relative to a grinding worm.
Figure 3:
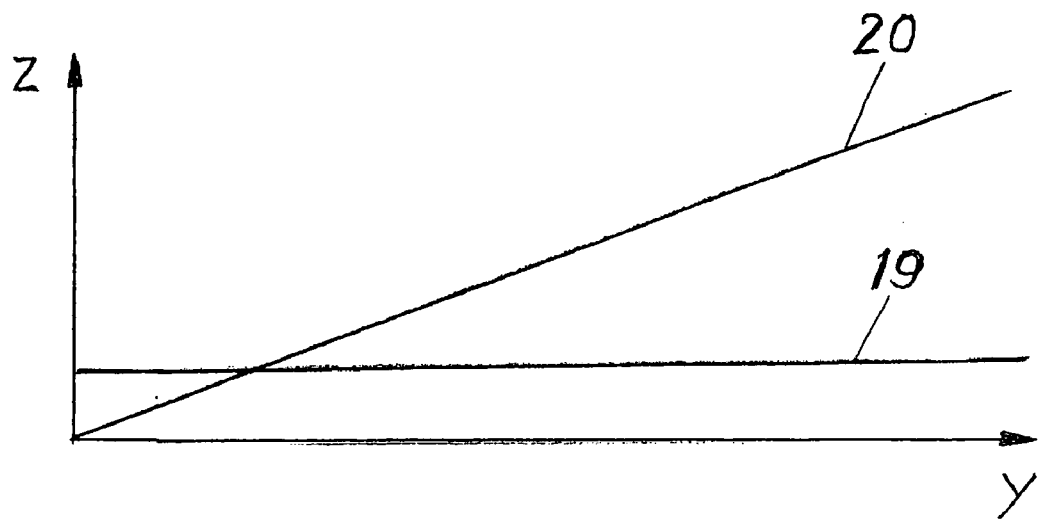
FIG. 3 illustrates a representation of the rectilinear movement of a gear wheel dressing tool relative to a grinding worm in a conventional tangential or diagonal process.

FIG. 2 shows that the superimposition on the movement of the tangential carriage 3 by the alternating movement of the axial carriage 4 effects an oscillating movement of the work piece spindle 6 and the dressing gear wheel arranged on the tool spindle. FIG. 2 shows that the dressing gear wheel performs an oscillating movement relative to the grinding worm 7. The oscillating movement can be a sinus function, but any other wave profile or periodic profile is also conceivable.

Figure 4:
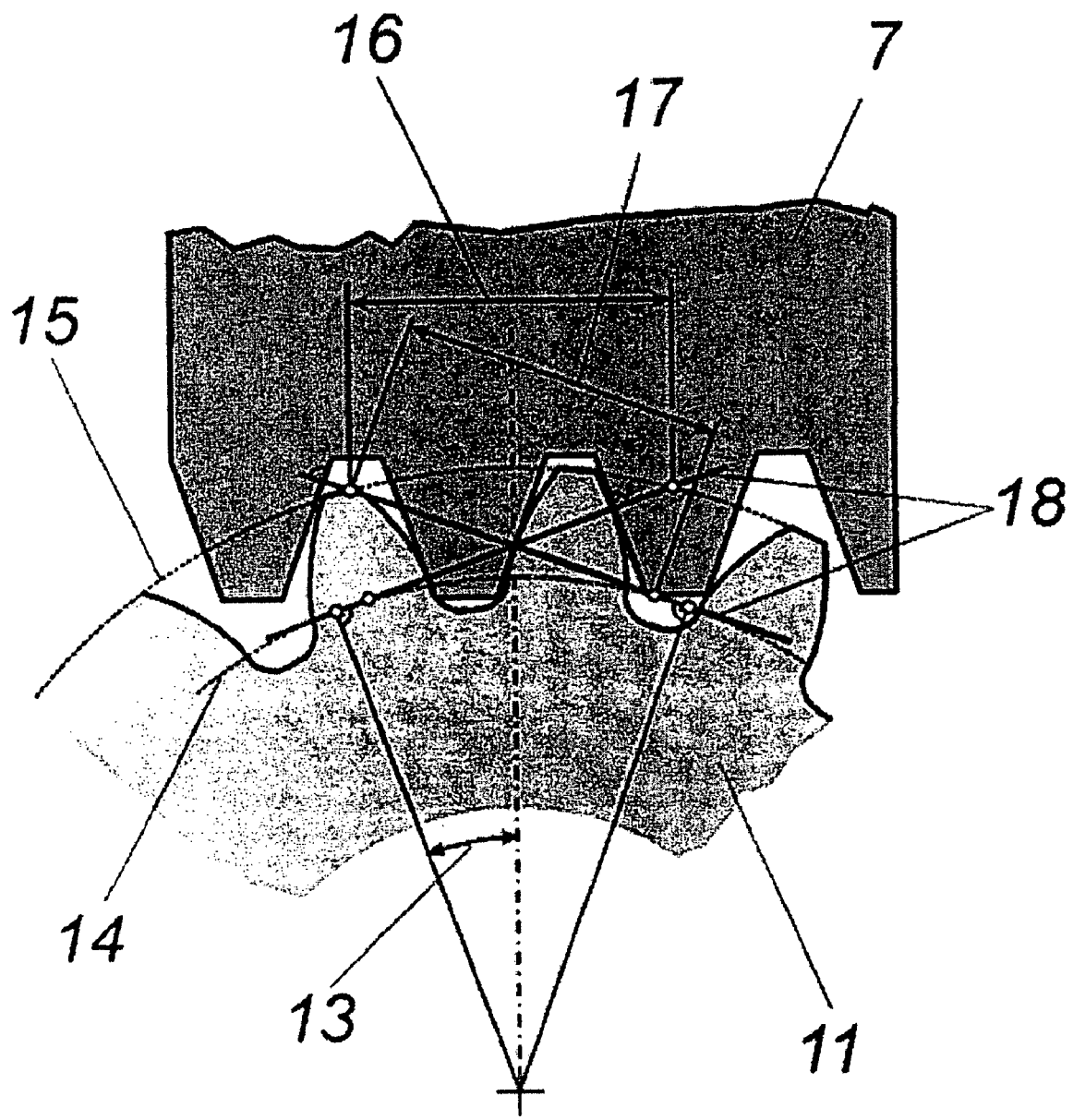
FIG. 4 shows a section in plane of rotation to explain the engagement width of a grinding worm utilized in the grinding of a gear wheel.

Later, in the machining of a work piece, only a specific width 16 (FIG. 4) of the total width of the grinding worm engages with the work piece 11. The utilized area is described as the engagement width $L_p$. The wavelength $\lambda$ of the oscillating movement of the work piece spindle 6 is selected so that it is the same as or smaller than the engagement width $L_p$ of the grinding worm 7 used in the machining of a work piece. The amplitude $Z_1/2$ of the oscillating movement is selected so that it is slightly smaller than half of the width of the dressing gear wheel. This ensures that in the dressing of a grinding worm, the dressing gear wheel used for this purpose is brought into engagement across its entire width within an engagement width of the grinding worm.

Preferably, the wavelength $\lambda$ of the oscillation movement is significantly smaller than the engagement width $L_p$ of the grinding worm 7 used in the machining of a work piece and also smaller than the circumference of the dressing gear wheel. In the area of its engagement width $L_p$ of the grinding worm 7, the dressing gear wheel therefore engages repeatedly with the grinding worm across its entire width. As a result, the quality fluctuations across the width of the dressing gear wheel are compensated. Therefore, the grinding worm 7 has a uniform profile quality across its entire useable width after it has been dressed. The uniform profile of the grinding worm is retained even after a repeated dressing of the grinding worm. Thus, the work pieces generated with a grinding worm dressed for the first time or dressed repeatedly also have a uniform profile.

Alternately to the shown embodiment, the gear wheel generation grinding machine used for the performance of the method could also be developed so that the movement in direction Y and Z is performed by the grinding worm rather than the gear wheel. In that case, the radial advance in direction X would be performed by the gear wheel.

The inventive method ensures that every area of the width of the dressing tool engages with the grinding worm to be dressed. Therefore, the profile deviations that exist across the width of the dressing gear wheel are superimposed, i.e. they are compensated. As a result, the dressed grinding worm has a uniform profile across its useable width, and the uniform profile is maintained even with repeated dressing. A grinding worm dressed in accordance with the invention will therefore produce work pieces of a quality that is accurately repeated. The ground work pieces have a uniform profile, regardless of what width area of the grinding worm they were ground with, and regardless of how often the grinding worm was dressed.

The method in accordance with the invention can be performed advantageously on a conventional gear wheel generation grinding machine. For this purpose, it is provided that the gear wheel dressing tool is accommodated on the work piece spindle and that the axes on the machine are used to generate the dressing movement between the dressing tool and the grinding worm.

LIST OF REFERENCE SYMBOLS

| | |
|---|---|
| 1 | Bed |
| 2 | Radial carriage |
| 3 | Tangential carriage |
| 4 | Axial carriage |
| 5 | Swinging base |
| 6 | Work piece spindle |

-continued

| 7 | Tool (grinding worm) |
|---|---|
| 8 | Tool drive |
| 9 | U-carriage |
| 10 | V-carriage |
| 11 | Gear wheel |
| 13 | Transverse pressure angle $a_t$ of the toothing |
| 14 | Diameter of the base circle $d_b$ of the toothing |
| 15 | Diameter of the addendum circle $d_a$ of the toothing |
| 16 | Engagement width $L_p$ |
| 17 | Engagement path $g_a$ |
| 18 | Engagement lines of the left and right flanks |
| 19 | Relative movement in the tangential method |
| 20 | Relative movement in the diagonal method |

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method for dressing a grinding worm on a machine suitable for continuous generation grinding of gears in a diagonal method, said method of dressing comprising:

providing a dressing tool having the form of an essentially cylindrical gear wheel, the dressing tool having an abrasive coating on the surface to effect the dressing;

bringing the dressing tool and the grinding worm into engagement with one another and moving the dressing tool relative to the grinding worm in the axial direction of the grinding worm to dress the flanks of the grinding worm, wherein during the dressing, a periodically alternating movement in the axial direction of the dressing gear wheel is superimposed on the relative movement of the dressing gear wheel, with the wavelength of the resulting oscillating relative movement being the same or smaller than the engagement width $L_p$ of the grinding worm in the axial direction of the grinding worm.

2. The method of claim 1 wherein the wavelength of the oscillating relative movement is same or smaller than the circumference of the dressing gear wheel.

3. The method of claim 1 wherein the amplitude of the oscillating relative movement is same or smaller than half of the width of the dressing gear wheel.

4. The method of claim 3 wherein the amplitude of the oscillating relative movement is slightly smaller than half of the width of the dressing gear wheel.

5. The method of claim 1 wherein the dressing gear wheel is accommodated on a work piece spindle of the machine and the axes of the machine are used to generate the oscillating relative movement between the dressing gear wheel and the grinding worm.

* * * * *